United States Patent
Garland et al.

(10) Patent No.: US 9,635,219 B2
(45) Date of Patent: Apr. 25, 2017

(54) SUPPLEMENTARY MEDIA VALIDATION SYSTEM

(71) Applicant: Nexidia Inc., Atlanta, GA (US)

(72) Inventors: Jacob Benjamin Garland, Norcross, GA (US); Drew Lanham, Menlo Park, CA (US)

(73) Assignee: NEXIDIA INC., Atlanta, GA (US)

(*) Notice: Subject to any disclaimer, the term of this patent is extended or adjusted under 35 U.S.C. 154(b) by 339 days.

(21) Appl. No.: 14/183,614

(22) Filed: Feb. 19, 2014

(65) Prior Publication Data

US 2015/0237298 A1    Aug. 20, 2015

(51) Int. Cl.
| | |
|---|---|
| *H04N 21/43* | (2011.01) |
| *H04N 21/488* | (2011.01) |
| *H04N 5/04* | (2006.01) |
| *G11B 27/00* | (2006.01) |
| *H04N 7/08* | (2006.01) |
| *H04N 7/088* | (2006.01) |
| *H04H 20/28* | (2008.01) |
| *H04H 20/42* | (2008.01) |
| *H04H 60/07* | (2008.01) |

(52) U.S. Cl.
CPC ............... *H04N 5/04* (2013.01); *G11B 27/00* (2013.01); *H04H 20/28* (2013.01); *H04H 20/423* (2013.01); *H04H 60/07* (2013.01); *H04N 7/08* (2013.01); *H04N 7/0885* (2013.01); *H04N 21/4307* (2013.01); *H04N 21/4884* (2013.01)

(58) Field of Classification Search
CPC G10L 15/26; H04N 21/4307; H04N 21/4884; H04N 7/0885
See application file for complete search history.

(56) References Cited

U.S. PATENT DOCUMENTS

| | | | | |
|---|---|---|---|---|
| 5,347,365 | A * | 9/1994 | Harigai | H04N 5/44513 331/11 |
| 5,428,400 | A * | 6/1995 | Landis | H04N 21/4884 348/461 |
| 6,442,518 | B1 * | 8/2002 | Van Thong | G10L 15/26 704/235 |
| 2005/0120391 | A1 * | 6/2005 | Haynie | H04H 60/07 725/135 |
| 2009/0119101 | A1 * | 5/2009 | Griggs | G10L 15/26 704/235 |
| 2010/0039558 | A1 * | 2/2010 | Detore | G11B 27/034 348/468 |
| 2011/0134321 | A1 * | 6/2011 | Berry | G11B 27/10 348/464 |
| 2012/0143606 | A1 * | 6/2012 | Pham | G10L 15/26 704/235 |
| 2013/0100347 | A1 * | 4/2013 | Zinovieva | G11B 27/031 348/468 |
| 2013/0124984 | A1 * | 5/2013 | Kuspa | H04N 9/475 715/255 |

(Continued)

*Primary Examiner* — Samuel G Neway
(74) *Attorney, Agent, or Firm* — Pearl Cohen Zedek Latzer Baratz LLP

(57) ABSTRACT

A method for preparing supplementary media content for coordinated transmission with multimedia content includes accepting the multimedia content including an audio portion, accepting the supplementary media content associated with the multimedia content, and validating the supplementary media content according to the audio portion of the multimedia content.

15 Claims, 6 Drawing Sheets

(56) References Cited

U.S. PATENT DOCUMENTS

| | | | |
|---|---|---|---|
| 2014/0109132 A1* | 4/2014 | Hasek | H04N 7/17318 |
| | | | 725/32 |
| 2015/0003797 A1* | 1/2015 | Schmidt | G11B 27/10 |
| | | | 386/201 |
| 2015/0215564 A1* | 7/2015 | Robinson | H04N 5/44508 |
| | | | 348/468 |
| 2015/0237298 A1* | 8/2015 | Garland | H04N 5/04 |
| | | | 348/466 |

* cited by examiner

SUPPLEMENTARY MEDIA VALIDATION SYSTEM

BACKGROUND

This invention relates to supplementary media validation.

Multimedia assets are typically transmitted (e.g., via wire or via radio-frequency communication) to multimedia players such as televisions, computers, or cellular telephones where they are displayed to one or more consumers. Some examples of multimedia assets which may be received by consumers include television shows, songs, and movies. In some examples, supplementary media content is transmitted with the multimedia asset requested by the user. Some examples of supplementary multimedia content include closed captions, alternative language tracks, and video description tracks.

In recent years, regulatory bodies have required that supplementary media content be distributed for at least some multimedia content distributed by broadcasters. For example, in the U.S. the FCC has required that affiliates in the top 25 markets and the top five rated cable networks provide at least 50 hours of video described programming per quarter under the 21st century communications and video accessibility act of 2010. In Canada, the CRTC has required all broadcasters to broadcast at least 4 hours per week of Canadian priority programming with supplementary media content. In the United Kingdom, Ofcom has required that broadcasters meet a 10% annual quota for supplemental media content.

SUMMARY

In a general aspect, a method for preparing supplementary media content for coordinated transmission with multimedia content includes accepting the multimedia content including an audio portion, accepting the supplementary media content associated with the multimedia content, and validating the supplementary media content according to the audio portion of the multimedia content.

Aspects may include one or more of the following features.

The supplementary media content may include a plurality of segments of text. Validating the supplementary media content may include determining whether a text content of the plurality of segments of text corresponds to a speech content of the audio portion of the multimedia content. The plurality of segments of text may include text content in a first language, the audio portion of the multimedia content may include speech content in a second language, and determining whether a text content of the plurality of segments of text corresponds to a speech content of the audio portion of the multimedia content may include determining if the first language and the second language are the same language.

Validating the supplementary media content may include identifying a temporal misalignment between a text content of the plurality of segments of text and a speech content of the audio portion of the multimedia content. The method my also include determining a rate of change of temporal misalignment over a plurality of segments of text and the speech content of the audio portion of the multimedia content. The method may also include mitigating the temporal misalignment between the text content of the plurality of segments of text and the speech content of the audio portion of the multimedia content according to the determined rate of change of temporal misalignment.

The supplementary media content may include an audio track and validating the supplementary media content may include determining whether at least some segments of the audio track which include speech content correspond to segments of the audio portion of the multimedia content which do not include speech content. The supplementary media content may include an audio track and validating the supplementary media content may include determining a total duration of speech activity in audio track, determining a total duration of speech activity in the audio portion of the multimedia content, and comparing the total duration of speech activity in the audio track to the total duration of speech activity in the audio portion of the multimedia content.

The supplementary media content may include an audio track and validating the supplementary media content may include identifying time intervals including voice activity in the audio portion of the multimedia content, identifying time intervals including voice activity in the audio track, and determining whether any of the time intervals including voice activity in the audio portion of the multimedia content overlaps with the time intervals including voice activity in the audio track.

The supplementary media content may include an audio track and validating the supplementary media content may include identifying a time offset between a content of the audio track and a content of the audio portion of the multimedia content, and aligning the content of the audio track to the content of the audio portion of the multimedia content based on the identified time offset. The supplementary media content may include an audio track and validating the supplementary media content may include comparing the audio track to the audio portion of the multimedia content to identify a first plurality of segments in the audio portion that do exist in the audio track and a second plurality of segments in the audio portion that do not exist in the audio track.

The plurality of segments of text may be associated with an expected time alignment to the audio portion of the multimedia content and validating the supplementary media content may include determining an actual alignment of the plurality of segments of text to the audio portion of the multimedia content, and comparing the actual alignment of the plurality of segments of text to the expected alignment of the plurality of segments of text.

Comparing the actual alignment of the plurality of segments of text to the expected alignment of the plurality of segments of text may include identifying one or more differences between the actual alignment of the plurality of segments of text and the expected alignment of the plurality of segments of text.

In another general aspect, a method for preparing supplementary media content for coordinated transmission with multimedia content includes accepting the multimedia content including an audio portion, accepting the supplementary media content associated with the multimedia content, the supplementary media content including a plurality of audio tracks, each audio track being associated with a corresponding language indicator, and validating the supplementary media content including, for each of one or more of the audio tracks, analyzing the audio track to determine whether a language of a speech content of the audio track matches the language indicator associated with the audio track.

In another general aspect, software embodied on a computer-readable medium includes instructions for causing a data processing system to prepare supplementary media content for coordinated transmission with multimedia content including accepting the multimedia content including an audio portion, accepting the supplementary media content associated with the multimedia content, and validating the supplementary media content according to the audio portion of the multimedia content.

Aspects may include one or more of the following advantages.

Aspects may have broad and accurate language support. Aspects utilize tests which are based on the indexing and analysis of dialogue present in the audio tracks. Caption verification and caption alignment features are based on a phonetic process which utilizes phonemes instead of words. As such, aspects are capable of handling proper names, slang and individual accents.

Certain aspects support any number of languages for verifying closed caption and video description content. New languages for use in language verification can be easily added by providing approximately a hundred hours of sample content.

Aspects may be able to detect and repair problems in a multimedia asset while requiring little to no input from a technician.

Aspects may save time and money by automatically ensuring that supplementary media content is correct while requiring little or no human interaction.

Other features and advantages of the invention are apparent from the following description, and from the claims.

DESCRIPTION

1 Overview

The distribution and use of digital multimedia assets is rapidly overtaking that of tape assets. At the same time, the complexity of digital multimedia assets is increasing, especially at the international level where a given asset may include supplementary media content (e.g., alternative audio tracks and/or captions) for many (e.g., sixteen) different languages.

As the complexity of multimedia assets has increased, performing quality control to ensure that the supplementary media content is correct and complete has become increasingly challenging. At the same time, the quality of supplementary media content directly impacts everyone involved in producing a multimedia asset, from the creator who sends the asset out for localization, to the distributor, to the broadcaster who airs the asset.

Figure 1:
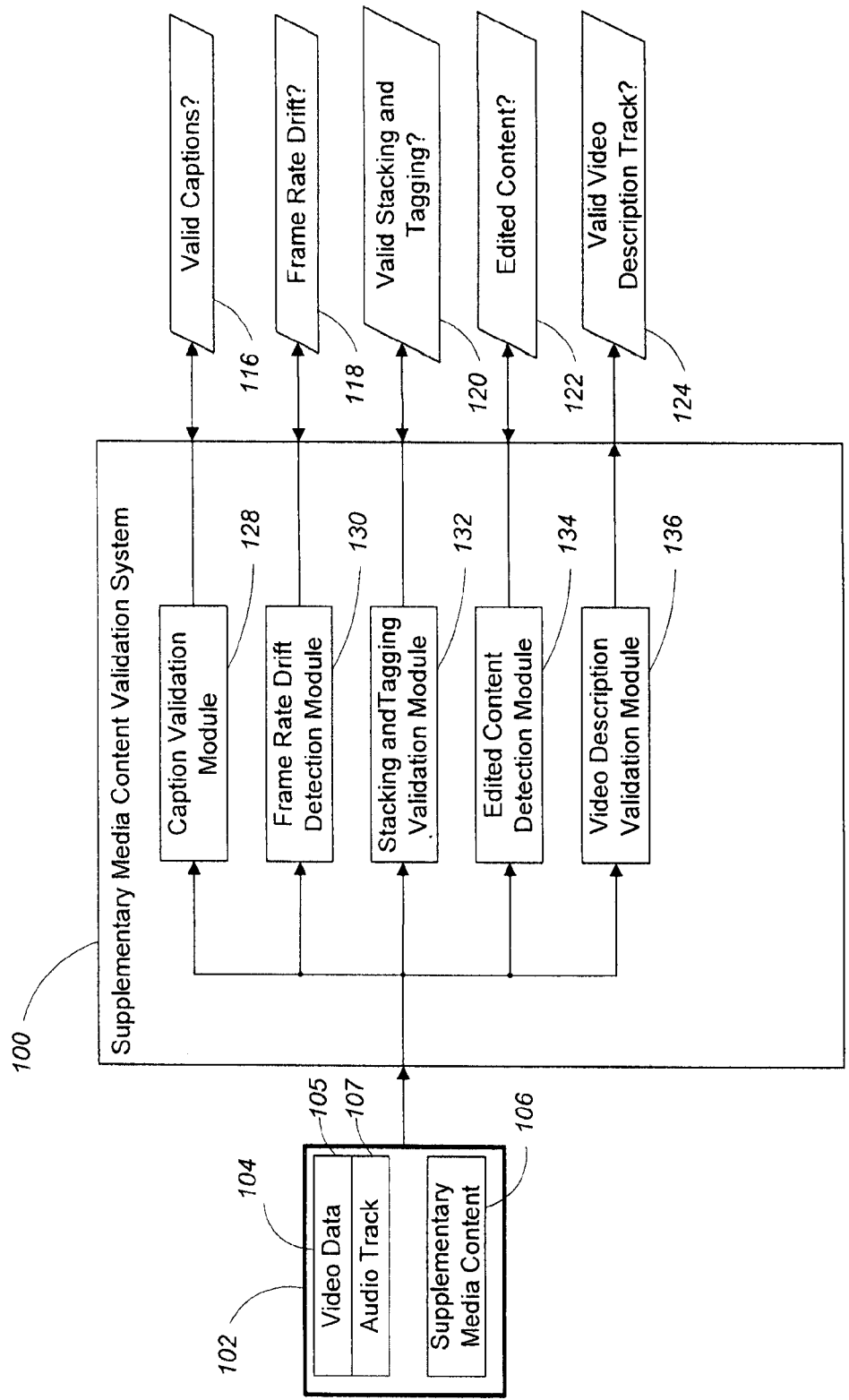
FIG. 1 is a supplementary media validation system.

Embodiments described herein automatically process digital multimedia data assets to ensure that the supplementary media content associated with the assets is correct and complete. Referring to FIG. 1, an embodiment of a supplementary media content validation system 100 receives a media asset 102 including multimedia content 104 (e.g., video data 105 and an associated audio track 107) and supplementary media content 106 (e.g., captions and/or a video description track) as inputs and processes the inputs to validate the supplementary media content 106 according to the multimedia content 104.

The supplementary media content validation system 100 processes its inputs to produce validation results including one or more of a caption validation result 116, a frame rate drift result 118, a stacking and tagging validation result 120, a edited content detection result 122, and a video description validation result 124. To process the inputs, the supplementary media content validation system 100 includes a caption validation module 128, a frame rate drift detection module 130, a stacking and tagging validation module 132, a edited content detection module 134, and a video description validation module 136.

As is described in greater detail below, the caption validation module 128 receives the media asset 102 as input and processes the media asset 102 to generate the caption validation result 116 as its output. The frame rate drift detection module 130 receives the media asset 102 as input and processes the media asset 102 to generate the frame rate drift result 118 as its output. The stacking and tagging validation module 132 receives the media asset 102 as input and processes the media asset to generate the stacking and tagging validation result 120 as its output. The edited content detection module 134 receives the media asset 102 as input and processes the media asset to generate the edited content detection result 122. The video description validation module 136 receives the media asset 102 and processes the media asset 102 to generate the video description validation result 124 as its output.

2 Caption Validation Module

One common type of supplementary media content 106 includes caption data (e.g., caption data used for closed captioning). In some examples, caption data for a given multimedia asset includes a number of segments of text which are each associated with a time interval (e.g. including a beginning timecode and an end timecode). Very generally, for a given caption, the beginning of the time interval indicates a time in the multimedia content 104 at which presentation of the segment of text to a consumer should begin and the end of the time interval indicates a time in the multimedia content 104 at which presentation of the segment of text to the consumer should end. In some examples, captions correspond to speech activity in the multimedia content 104. In other examples, captions correspond to other types of activity in the multimedia asset. For example, a caption may display the phrase "(laughter)" to indicate the presence of laughter in the multimedia content or "♪" to indicate the presence of music in the multimedia content.

On occasion, a publisher of the multimedia asset 102 may associate incorrect caption data with the multimedia content 104. One example of incorrect caption data is caption data for an entirely different instance of multimedia content 104 (e.g., caption data for an episode of the television series "How I Met Your Mother" is erroneously associated with the multimedia content 104 of an episode of the television series "The Big Bang Theory"). Another example of incorrect caption data is incomplete caption data (e.g., no caption is present for a time interval of the multimedia content 104 which includes voice activity). Yet another example of incorrect caption data is caption data which includes text in a language different than the language of the multimedia content 104.

Figure 2:
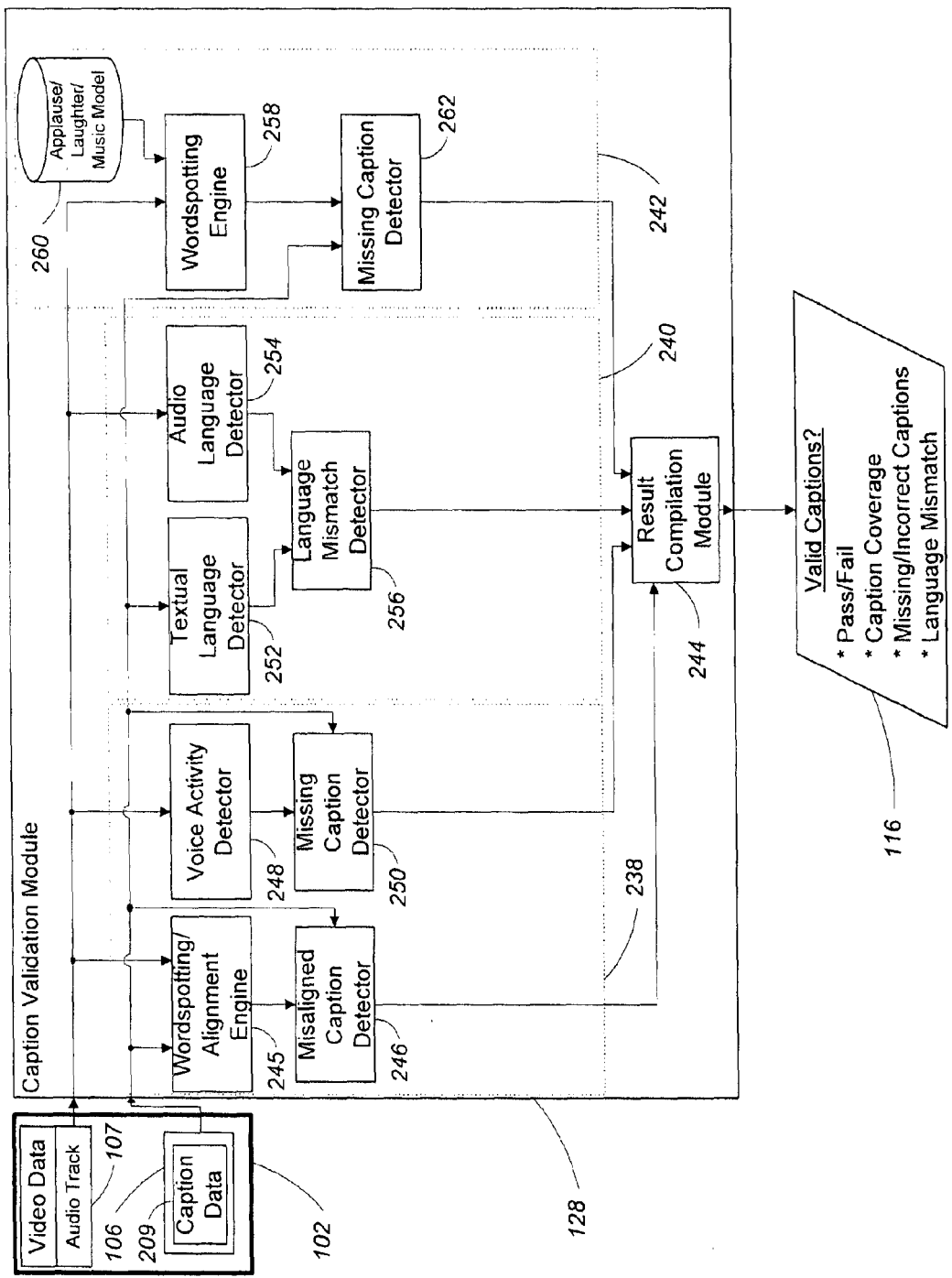
FIG. 2 is a caption validation module

Referring to FIG. 2, the caption validation module 128 is configured to analyze the supplemental media content 106 of the media asset 102, including caption data 209, and to generate the caption validation data 116 based on the analysis. To perform the analysis of the supplemental media content 106, the caption validation module 128 includes a caption presence/alignment validation section 238, a caption language validation section 240, an applause/laughter/music validation section 242, and a result compilation module 244.

2.1 Caption Presence and Alignment Validation

In some examples, the caption/presence alignment validation section 238 automates an analysis of whether the caption data 209 includes captions which are properly aligned to the audio track 107 by aligning the caption data 209 against the audio track 107 (also referred to as an audio portion) and flagging any captions of the caption data 209 which do not align within a predetermined tolerance level as misaligned. In some examples, the caption/presence alignment validation section 238 also analyzes the audio track 107 to flag any areas of the audio which include voice activity but do not have corresponding caption blocks in the caption data 209. In some examples, the flagged segments are used by the result compilation module 244 to compute a caption coverage score and to determine a pass/fail result for the caption data 209.

To this end, the caption presence/alignment validation section 238 includes a wordspotting/alignment engine 245, a voice activity detector 248, a misaligned caption detector 246, and a missing caption detector 250. The audio track 107 is provided to the wordspotting/alignment engine 245 which attempts to align each of the captions in the caption data 209 with a time interval in the audio track 107 of the multimedia data 104. One implementation of such a wordspotting/alignment engine is described in U.S. Patent Publication No. 2009/0119101 A1, filed Jan. 12, 2009, which is incorporated by reference.

The output of the wordspotting/alignment engine 245 includes an actual time alignment of at least some of the captions with a time interval the audio track 107 of the multimedia data 104. The output of the wordspotting/alignment engine 245 along with the caption data 209 is provided to the misaligned caption detector 246 which compares the expected time intervals associated with captions in the caption data 209 to the time intervals associated with the captions in the actual alignment of the captions generated by the wordspotting/alignment engine 245. If the expected time interval associated with a given caption is substantially different (e.g., as determined by a thresholding operation) from the actual time interval for the caption determined by the wordspotting/alignment engine 245, the caption is considered to be misaligned.

The audio track 107 of the multimedia data 106 is also provided to the voice activity detector 248 which identifies time intervals in the audio track 107 that include voice activity. One example of a voice activity detector is an HMM-based Viterbi segmentation. In such a voice activity detector, speech is modeled using speech and non-speech states, with transition penalties between the two states. The state likelihoods can then be calculated using Gaussian Mixture Models. In some examples, the output of the voice activity detector 248 includes time intervals indicating segments of the audio track 107 in which voice activity is present. The output of the voice activity detector 248 and the caption data 209 are provided to a missing caption detector 250 which compares the time intervals in which voice activity is present to the time intervals associated with the captions in the caption data 209. If voice activity is present in the audio track 107 at a given time interval but no caption is associated with that time interval, then the missing caption detector 250 indicates that a caption may be missing at that time interval.

The outputs of the misaligned caption detector 246 and the missing caption detector 250 are passed out of the caption presence/alignment validation section 238 and provided to the result compilation module 244.

2.2 Caption Language Validation

The caption language validation section 240 is configured to validate whether the language of the caption data 209 matches the language of the audio track 107. The caption language validation section 204 includes a textual language detector 252, an audio language detector 254, and a language mismatch detector 256. The textual language detector 252 receives the caption data 209 as input and analyzes the text in the captions to determine the most likely language of the captions. The textual language detector 252 generates an output including the most likely language of the caption data 209. In some examples, the textual language detector 252 makes use of language specific dictionaries and/or statistical language models to identify the language of the text. In some examples, the textual language detector generates letter-grams (e.g., 1-5 letter letter-grams) from the text and compares an occurrence rank of the letter-grams with previously trained models. In some examples, the models are trained on one to ten pages of text using the same features.

The audio language detector 245 receives the audio track 107 of the multimedia content 106 and analyzes the audio content to determine the most likely language for the audio content. The audio language detector 254 generates an output including the most likely language of the audio content. In some examples, the audio language detector 254 makes use of language specific dictionaries and statistical acoustic models to identify the language of the audio content. In some examples, the audio language detector 254 includes a set of parallel phonetic recognizers. Mono-, bi-, and trigram statistics are collected for each parallel stream to create a high-dimensional utterance vector, which is then normalized by the utterance length. A back-end processor uses the utterance vectors as input for separate discriminator models for every language pair, resulting in $N*(N-1)/2$ models. These scores are collected into an N×N matrix and passed to a final classifier that applies a statistically trained nonlinearity to convert the discriminator outputs into language probabilities. These probabilities are used to determine the most likely language.

The output of the textual language detector 252 and the output of the audio language detector 254 are provided to the language mismatch detector 256 which compares the most likely language for the caption data 209 to the most likely language for the audio data 107. If the two languages are the same then the language mismatch detector 256 generates an output indicating that there is no language mismatch between the caption data 209 and the audio track 107 of the multimedia content 106. Otherwise, if the two languages differ, the language mismatch detector 256 generates an output indicating that there is a language mismatch between the caption data 209 and the audio track 107 of the multimedia content 106. The output of the language mismatch detector 256 is passed out of the caption language validation section 240 to the result compilation module 244.

2.3 Applause/Laughter/Music Validation

The applause/laughter/music validation section 242 is configured to determine whether the caption data 209 includes captions for applause, laughter, and music which may be present in the audio track 107. The applause/laughter/music validation section 242 includes a wordspotting/alignment engine 258, an applause/laughter/music model 260 (e.g. a model trained for applause, laughter, and music), and a missing caption detector 262. In some examples, the wordspotting/alignment engine 258 and the missing caption detector 262 are the same as the wordspotting/alignment engine 245 and missing caption detector 246 used in the caption presence/alignment validation section 238.

The wordspotting/alignment engine 258 receives the audio track 107 of the multimedia data 106 and the applause/laughter/music model 260 as inputs. The wordspotting/alignment engine 258 processes the audio track 107 according to the applause/laughter/music model 260 to identify time intervals in the audio content of the audio track 107 which include applause, laughter, or music. The time intervals identified by the wordspotting/alignment engine 258 are provided to the missing caption detector 262 along with the caption data 209.

The missing caption detector 262 compares the time intervals in which applause, laughter, or music is present to the time intervals associated with the captions in the caption data 209. If applause, laughter, or music is present in the audio track 107 at a given time interval but no caption indicating applause, laughter or music (e.g., the "♪" character for music) is associated with that time interval, then the missing caption detector 262 indicates that a caption is missing at that time interval. The output of the missing caption detector 262 is passed out of the applause/laughter/music validation section 242 to the result compilation module 244.

The result compilation module 244 receives the respective outputs of the caption presence/alignment validation section 238, the caption language validation section 240, and the applause/laughter/music validation section 242 as inputs and processes the inputs to generate the caption validation result 116.

In some examples, the result compilation module processes its inputs to determine a number of results including one or more of a caption coverage result, a missing/incorrect captions result, a language mismatch result, and a pass/fail result.

In some examples, the caption coverage result represents a ratio of the amount of captionable time in the audio track 107 to the amount of time in the audio track 107 of the which is actually associated with a caption (e.g., an audio track 107 may have 93% of its captionable time represented in captions). In some examples, the caption coverage result can be determined by first computing a total captioned time by summing the time intervals associated with the captions of the caption data 209 and computing a total captionable time by summing the total captioned time with the time intervals associated with the missing captions identified by the missing caption detector 250. The ratio of the total captioned time to the total captionable time is returned as the caption coverage result.

In some examples, the missing/incorrect captions result includes an indication of captions which are missing, misaligned, or otherwise incorrect. The missing/incorrect captions result can be computed using the outputs of the misaligned caption detector and the two missing caption detectors 250, 262.

In some examples, the language mismatch result is simply the output of the language mismatch detector 256, indicating whether the language of the caption data 209 matches the language of the audio track 107 of the multimedia content 106.

In some examples, the pass/fail result is determined based on the caption coverage result, the missing/incorrect captions result, and the language mismatch result. For example, if the language mismatch result indicates that a language mismatch is present, the pass/fail result indicates a failure. If the caption coverage is below a predetermined threshold, the pass/fail result indicates a failure. If the missing/incorrect captions result indicates a number of missing/incorrect captions which exceeds a predetermined threshold, the pass/fail result indicates a failure. Otherwise, the pass/fail result indicates a pass result.

In some examples, the caption validation result 116 is provided to a repair user interface which allows a technician to correct the caption data 209. For example, if one or more captions are missing a technician can manually augment the caption data in the time intervals which include missing captions. If there is a language mismatch between the caption data 209 and the multimedia data 104, the technician can swap the incorrect language caption data for caption data of the correct language.

3 Frame Rate Drift Detection Module

As is described above, captions are associated with (or include) timecodes to represent when, during presentation of video content, a caption should be shown and/or hidden. In general, the timecodes are based on a framerate of the video content. In some examples, when a framerate of the video is altered, the timing of the captions can appear to "drift" relative to the video. For example, the captions may appear to be properly aligned during the beginning of a presentation of the video content. As presentation of the video content continues, the captions may progressively, and at a constant rate, lose alignment with the video content. For example, early in the video a consumer may notice only a slight delay between the speech activity in the video content and the presentation of the corresponding caption. Later in the video, the delay will become more and more noticeable, with the delay between the speech activity in the video content and the presentation of the corresponding captions increasing at a constant rate.

Figure 3:
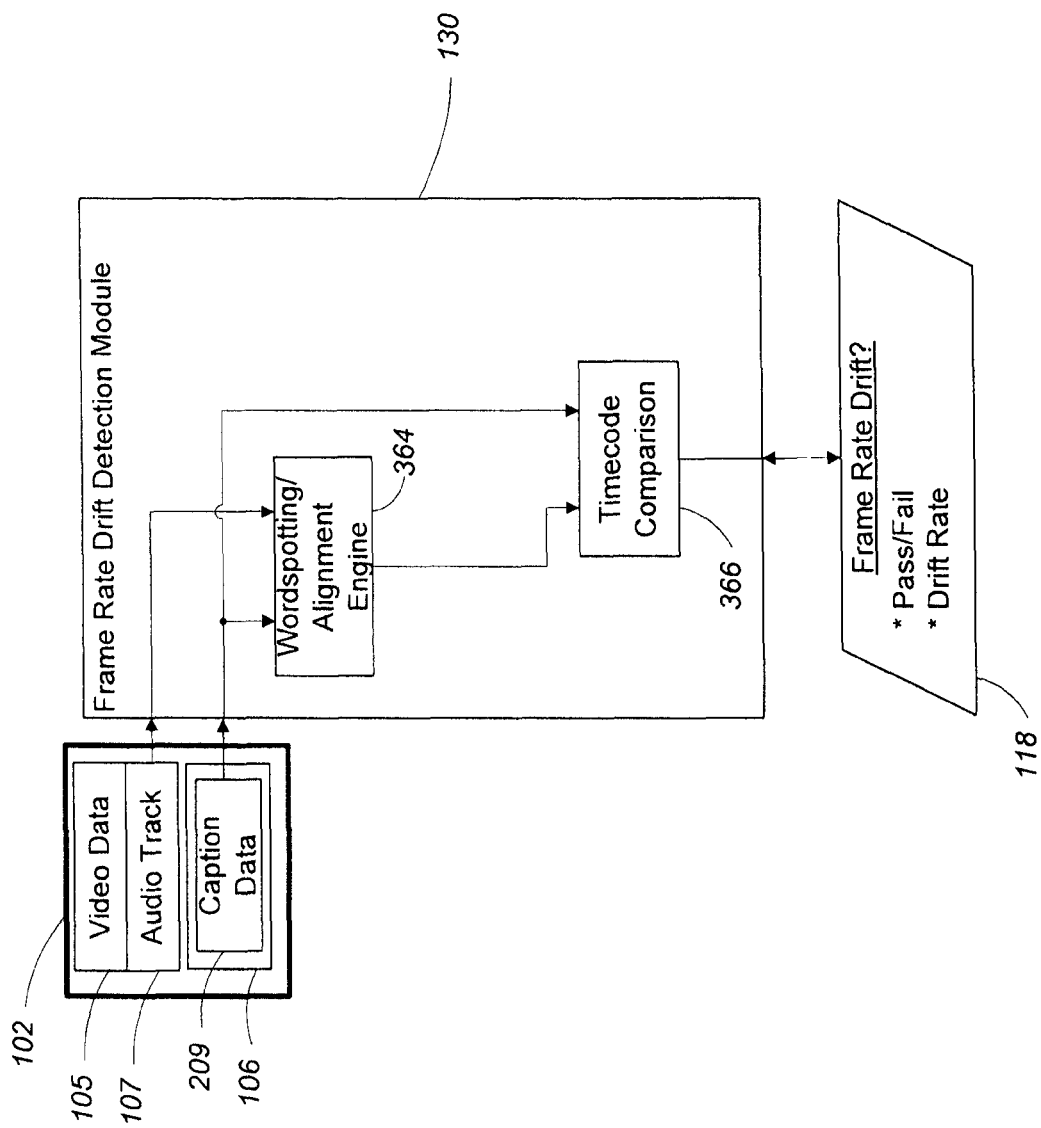
FIG. 3 is a frame rate drift detection module.

Referring to FIG. 3, the frame rate drift detection module 130 receives the multimedia asset 102 as input and processes the multimedia asset 102 to generate the frame rate drift validation result 118 including a pass/fail result and an indication of the framerate drift rate. The framerate drift detection module 130 includes a wordspotting/alignment engine 364 and a timecode comparison module 366. To determine the framerate drift rate for the frame rate drift validation result 118, the audio track 107 of the multimedia content 104 and the caption data 209 included in the supplementary media content 106 are provided to the wordspotting/alignment engine 364. The wordspotting/alignment engine 364 attempts to align each of the captions in the caption data 209 with a time interval in the audio track 107 of the multimedia data 104. The output of the wordspotting/alignment engine 364 includes the captions from the caption data 209 aligned to time intervals in the audio track 107 of the multimedia data 104.

The aligned captions and the original captions from the caption data 209 are provided to the timecode comparison module 366 which compares the timecodes of the aligned captions to the timecodes of the captions from the caption data 209 to identify differences in the timecodes associated with the respective captions. Then a rate of change of the differences in the timecodes is determined. This rate of change (if any exists) is included in the framerate drift validation result 118 as the framerate drift rate. In some examples, a predefined threshold is applied to the framerate drift rate and if the framerate drift rate exceeds the threshold, a fail result is included in the framerate drift validation result 118. Otherwise, if the framerate drift rate is below the threshold, a pass result is included in the framerate drift validation result 118.

In some examples, a repair module (not shown) in the frame rate drift detection module can alter the timecodes of the captions in the caption data 209 based on the determined framerate drift rate to undo the drift between the multimedia content 104 and the caption data 209.

4. Stacking and Tagging Validation Module

In certain situations, broadcasters broadcast programs that offer the consumer the ability to watch the program while listening to an alternate language. To enable this functionality, the broadcaster encodes the media with a number of alternative language tracks prior to the broadcast. Each of the alternative language tracks is labeled with a corresponding language "tag." For example, track 1="en", track 2="es", track 3="fr", and so on. In some examples, the process of tagging the alternative language tracks is performed manually and is prone to errors.

Figure 4:
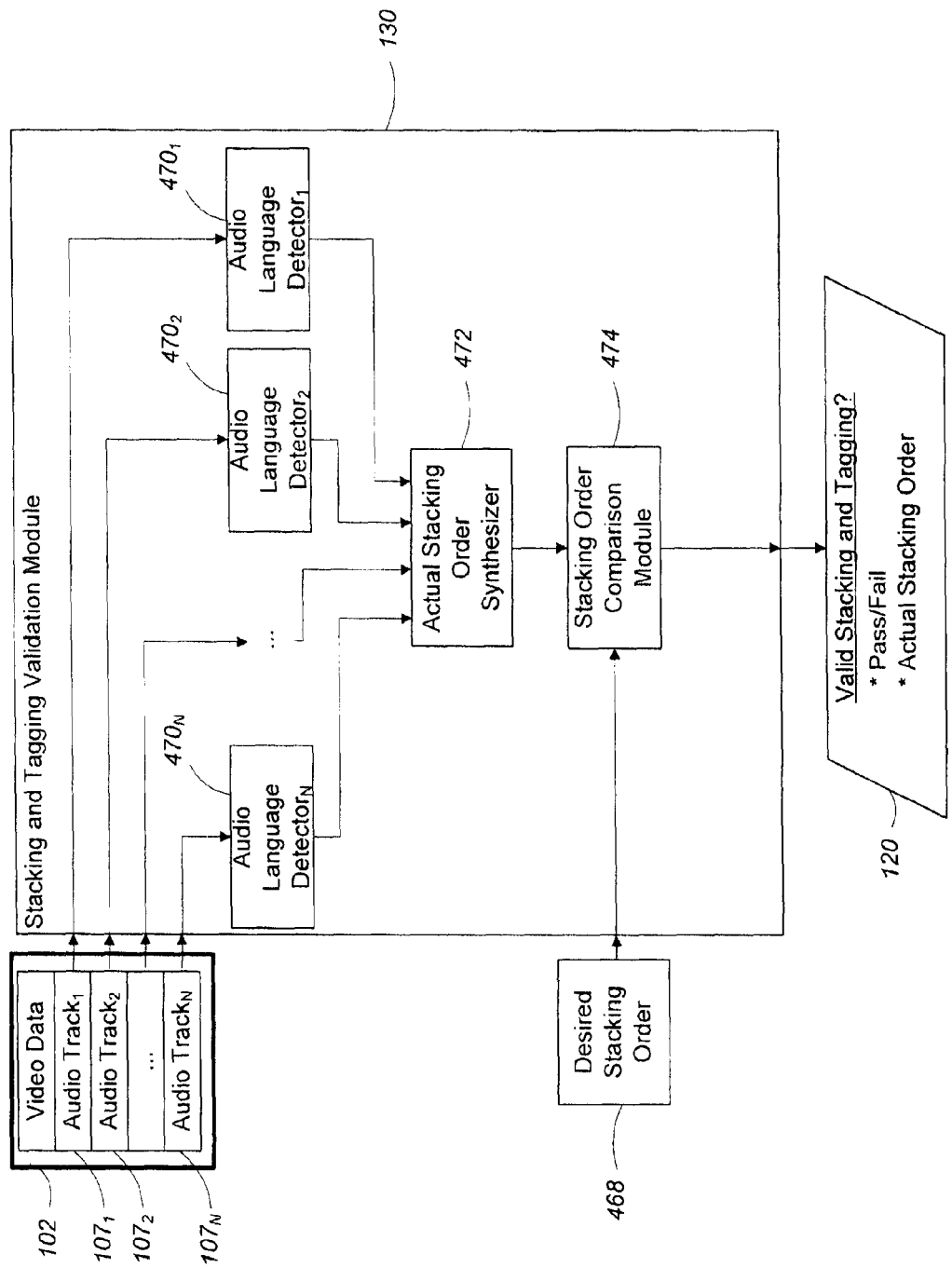
FIG. 4 is a stacking and tagging validation module.

Referring to FIG. 4, the stacking and tagging validation module 132 receives a desired audio track stacking order 468 and the multimedia asset 102 including N audio tracks 107 (labeled 1 through N) as inputs. The stacking and tagging validation module 132 processes the inputs to generate the stacking and tagging validation result 120 including a pass/fail result and an actual stacking order.

The stacking and tagging validation module 132 includes N audio language detectors $470_1$-$470_N$, an actual stacking order synthesizer 472, and a stacking order comparison module 474. Each of the N audio tracks 107 is provided as input to a respective one of the N audio language detectors $470_1$-$470_N$. Each of the N audio language detectors $470_1$-$470_N$ processes its audio track input to determine a most likely language associated with the content to the audio track. The most likely languages determined by the N audio language detectors $470_1$-$470_N$ are provided as inputs to the actual stacking order synthesizer 472. The actual stacking order synthesizer 472 assembles the most likely languages into an actual stacking order output representing the actual stacking order of the N audio tracks 107 in the multimedia asset 102.

The actual stacking order output is provided as input to the stacking order comparison module 474 along with the desired stacking order 468. The stacking order comparison module 474 compares the two stacking orders to determine if they are the same. If the stacking order comparison module 474 determines that the actual stacking order is the same as the desired stacking order 468, a pass result is included in the stacking and tagging validation result 120. Otherwise, if the stacking order comparison module 474 determines that the actual stacking order is different than that desired stacking order 468, a fail result is included in the stacking and tagging validation result 120. In some examples, the actual stacking order is also included in the stacking and tagging validation result 120.

It is noted that, in FIG. 3 and in the above description, the N audio language detectors are included for illustrative purposes and, in an actual implementation of the stacking and tagging validation module 132, a single audio language detector may be used to processes the N audio tracks in a loop.

In some examples, the stacking and tagging validation module 130 can be used to automatically repair the stacking and tagging of the multimedia asset 102. For example, the stacking order of the audio tracks 107 in the multimedia asset 102 can be corrected based on the stacking and tagging validation result 120.

5 Video Description Validation Module

Very generally, a video description track is a secondary audio program (SAP) which aids the visually-impaired by audibly describing scenes which do not have dialogue (e.g. "The car pulls up outside the police station. Two men get out."). Typically, a video description track is an augmented version of the audio track 107.

Figure 5:
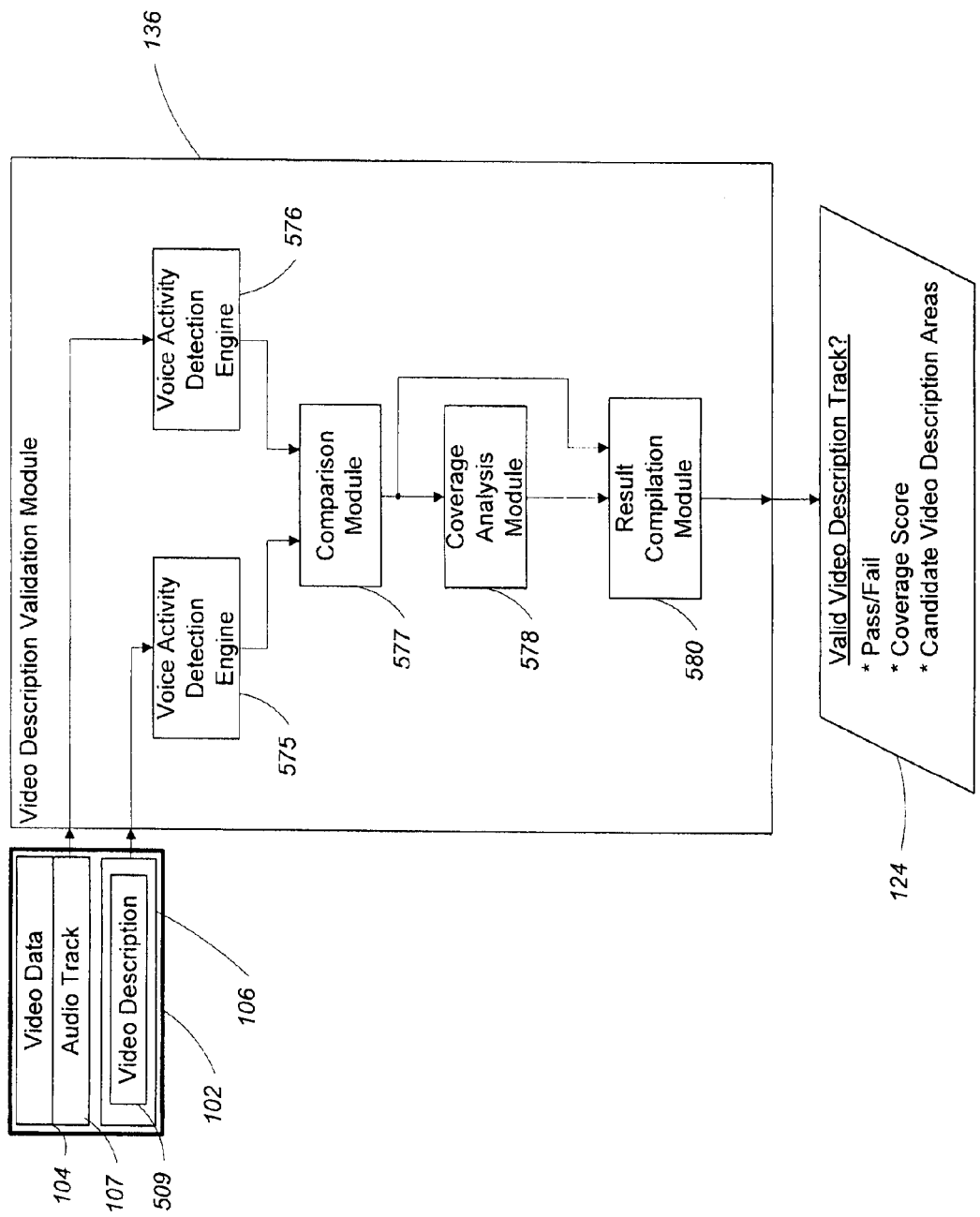
FIG. 5 is a video description validation module.

Referring to FIG. 5, the video description validation module 136 receives the audio track 107 and a video description track 509 (included in the supplementary media content 106) as inputs and processes the inputs to generate a video description validation result 124. Very generally, the video description validation module 136 processes the inputs, including comparing the audio track 107 of the multimedia data 104 and the video description track 509 to identify all segments in which the audio content of the two tracks differs. The video description validation result 124 is generated based on the identified segments. In some examples, the video description validation result 124 includes one or more of a pass/fail result, a video description coverage score, or a detailed report including the timecodes where video description was detected or is missing.

In some examples, the video description validation module 136 includes a first voice activity detection engine 575, a second voice activity detection engine 576, a comparison module 577, a coverage analysis module 578, and a result compilation module 580. In some examples, each of the voice activity detection engines 575, 576 includes an HMM-based Viterbi segmentation. In the voice activity detection engines 575, 576, speech is modeled using speech and non-speech states, with transition penalties between the two states. The state likelihoods can then be calculated using Gaussian Mixture Models. The first voice activity detection engine 575 receives the audio track 107 and identifies time intervals in the audio track 107 in which voice activity is present. The second voice activity detection engine 576 receives the video description track 509 and identifies time intervals in the video description track 509 in which voice activity is present.

The time intervals with voice activity identified by the first and second voice activity detection engines 575, 576 are provided to the comparison module 577. The comparison module 577 compares the time intervals with voice activity in the audio track 107 to the time intervals with voice activity in the video description track 509 to identify time intervals associated with video description content in the video description track 509. In some examples, if a time interval in the video description track 509 is includes voice activity but the same time interval in the audio track 107 does not include voice activity, the time interval is designated as including video description content. Otherwise, if a time interval includes voice activity in both the audio track 107 and the video description track, the time interval is designated as including regular programming content.

The output of the comparison module 177 is provided to a coverage analysis module 578 which determines a coverage score for the video description track 509. In some examples, the coverage analysis module 578 includes a pre-defined window which defines a time interval in which video description content must be present in order for the time interval to be designated as "covered." For example, the pre-defined window can be slid along a time duration of the video description track 509. As the window is slid along the time duration, if video description content is present in the window, then the time interval within the window is considered to be "covered." If no video description content is present in the window, then the time interval within the window is considered to be "not covered." In some examples, the coverage score determined by the coverage analysis module includes a ratio of the time of the video description track 509 which is considered to be "covered" to the total time duration of the video description track 509.

The coverage score and the output of the comparison module 577 are provided as inputs to the result compilation module 580 which processes the inputs to generate the video description validation result 124. In some examples, the result compilation module 580 analyzes the output of the comparison module 577 to determine whether any time intervals in the video description track 509 are designated as including video description content. In some examples, if any time intervals are designated as including video description content, then a pass result is included in the video description validation result 124. Otherwise, if no time intervals in the video description track 509 are designated as including video description content, then a fail result is included in the video description validation result 124.

In other examples, the pass/fail result is based on the coverage score determined by the coverage analysis module 578. For example, the result compilation module can apply a threshold to the coverage score; if the coverage score for the video description track 509 exceeds the threshold, a pass result is included in the video description validation result 124. Otherwise, if the coverage score for the video description track 509 exceeds the threshold, a fail result is included in the video description validation result 124. In some examples, both the pass/fail result and the coverage score are included in the video description validation result 124.

In some examples, the video description validation module 136 also generates a list of candidate video description areas. For example, time intervals of the audio track 107 or the video description track 509 which do not include voice activity are all candidate time intervals for video description content. In some examples, this feature can accelerate the sometimes tedious process of creating or editing the video description track 509. In some examples, other detectors can also be used to increase the accuracy of candidate video description time intervals. For example, a sound-effects detector engine could be used. The presence of sounds effects combined with the absence of dialogue indicates that action is happening on screen which should or could be described. Other hints such as facial detection could be used to further refine the candidate video description areas.

In some examples, if the output of the comparison module 577 indicates that the video description track 509 includes the same amount or less of voice activity than the audio track 107, the video description validation result is immediately output with a fail result.

In some examples, the comparison module 577 may identify that one or more time intervals include voice activity in both the video description track 509 and the audio track. In such a "cross talk" situation, the video description validation result is immediately output with a fail result.

In some examples, the video description track 509 may be offset (e.g., by a second or so) from the audio track 107. The video description validation module 136 can be configured to determine this offset (e.g., based on feature vectors from each of the tracks 509, 107) and to align the tracks 509, 107 based on the determined offset.

6 Edited Content Detection

Before broadcasting a multimedia asset, broadcasters may edit the content of the multimedia asset for a variety of reasons. One common reason for editing the content of the multimedia asset is to shorten the run time of the asset such that it fits into a predefined time slot. One process for shortening a run time of a multimedia asset is referred to as "time-tailoring." Very generally, when a program is time tailored, small segments or entire scenes of original content are removed throughout the program in order to shorten its runtime while avoiding a change to the storyline.

Figure 6:
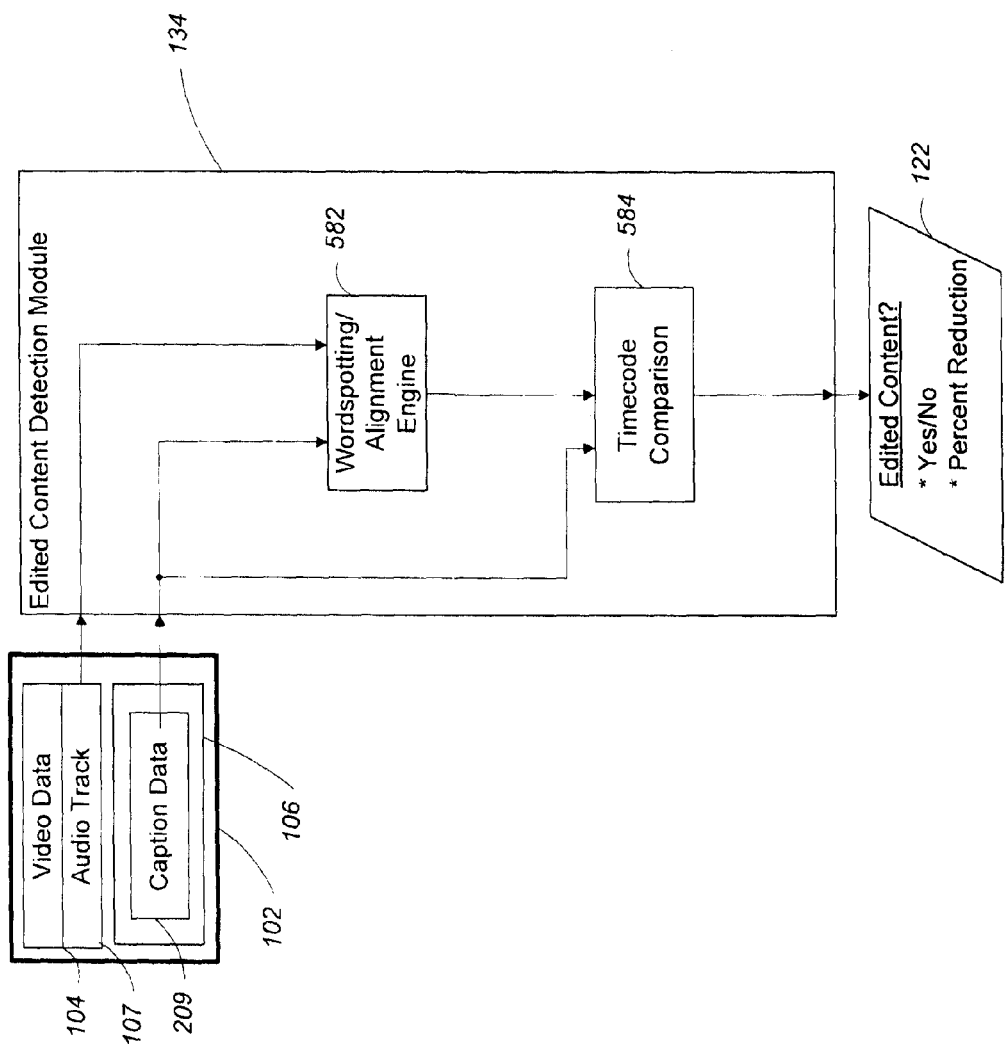
FIG. 6 is an edited content detection module.

Referring to FIG. 6, the edited content detection module 134 is configured to detect edits which have been made to the content of a multimedia asset 102, without having a corresponding edit made to the supplementary media content (e.g., the caption data). The types of edits which can be detected by the edited content detection module 134 include but are not limited to edits made during a time-tailoring process. For the purpose of illustration, the following description relates to detection of time tailoring of the multimedia asset. However, it is noted that the described example does not preclude use of the edited detection module 134 to detect other types of edited content (e.g., added content or modified content)

The edited content detection module 134 receives the multimedia asset 102 including the multimedia data 104 and the supplementary media content 106 as input and processes the multimedia asset 102 to generate the edited content detection result 122. In some examples, the edited content detection result 122 includes a yes/no indicator of whether the content of the multimedia asset is edited (e.g., time tailored) and/or an indication of an extent to which the multimedia asset is edited (e.g., a percentage of reduction in of the duration of the multimedia data 104 due to time tailoring).

The edited content detection module 134 includes a wordspotting/alignment engine 582 and a timecode comparison module 584. The wordspotting/alignment engine 582 receives the audio track 107 and the caption data 209 as inputs and attempts to align each of the captions in the caption data 209 with a time interval in the audio track 107. The output of the wordspotting/alignment engine 582 includes an actual alignment of the captions in the caption data 209 to the audio track 107.

The caption data 209 and the output of the wordspotting/alignment engine 582 are provided to the timecode comparison module 584 which compares the time intervals associated with the actual alignments of the captions to the time intervals associated with the captions in the caption data 209. If an offset exists between the time intervals associated with the actual alignments of the captions and the time intervals associated with the captions in the caption data 209, then the multimedia data 104 is designated as having edited content (e.g., the multimedia data is time tailored) in the edited content detection result 122. If no offset is detected, the multimedia data 104 is designated as not having edited content (e.g., the multimedia data is not time tailored). In the case that the multimedia data 104 is time tailored, the largest offset between a time interval associated with an actual alignment of a caption and a time interval associated with the caption in the caption data 209 can be used to determine a percentage of reduction in duration of the multimedia content 104 due to time tailoring. The percentage of reduction can be included in the edited content detection result 122.

In an alternative embodiment, when a master version of the multimedia asset 102 is available, the multimedia asset 102 can be compared with the master audio track to detect the similarities and differences between the two multimedia assets. Patterns of editing can be determined based on the detected similarities and differences. If many small edits occur throughout the multimedia content 104 of the multimedia asset 102, then the program can be categorized as being time tailored.

7 Alternatives

In some examples, the caption validation module can use configurable parameters which outline acceptable levels of caption accuracy, caption timing, caption coverage when determining the caption validation result.

In some examples, aspects are configured to identify the language in one or more audio tracks of the multimedia data for a multimedia asset and verify that the tracks match their intended language, independent of any metadata. In some examples, each track is analyzed against a set of possible languages specified in a pre-defined test profile. The results of the test returned are the primary language spoken in each track along with a confidence score. All the tracks are checked at the same time and there is no limit to the number of tracks that can be checked for a piece of media. Language verification is extremely accurate given any reasonable amount of audible dialogue ensuring that the correct language is always on the correct track.

In some examples, when the supplementary media validation system discovers invalid supplementary media, a repaired media asset is also generated by the supplementary media validation system.

In some examples, aspects described above support closed caption formats such as SCC, SMPTE, TT, CAP, and SMI. Aspects, however, are not limited to these formats.

Aspects of the above-described system can be run at any of a number of different points in the workflow of an organization such as: upon receipt of new content, after editing content, after transcoding content, before broadcast or distribution, after broadcast or distribution.

8 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A computer-implemented method for preparing supplementary media content for coordinated transmission with multimedia content, the method comprising:
    accepting, by a wordspotting engine, the multimedia content including an audio portion;
    accepting, by the wordspotting engine, caption data included in the supplementary media content associated with the multimedia content;
    validating the supplementary media content according to the audio portion of the multimedia content based on a phonetic process, wherein validating the supplementary media content comprises:
        aligning, by the wordspotting engine, the caption data against the audio portion based on a phonetic process;
        determining, for captions of the caption data, corresponding actual time intervals in the audio portion;
        flagging captions which do not align within a predetermined tolerance level as misaligned;
    determining a most likely first language of the caption data;
    analyzing the audio content to determine a most likely second language for the audio portion of the multimedia content;
    comparing the most likely first language and the most likely second language;
    if the first and second language are the same language, generating an output indicating that there is no language mismatch; and
    if the first and second language differ, generating an output indicating that there is a language mismatch.

2. The method of claim 1 wherein validating the supplementary media content further comprises comparing expected time intervals associated with the captions in the caption data to the actual time intervals in the audio portion determined by the wordspotting engine.

3. The method of claim 1 wherein the supplementary media content includes a plurality of segments of text and wherein validating the supplementary media content includes determining whether a text content of the plurality of segments of text corresponds to a speech content of the audio portion of the multimedia content.

4. The method of claim 3 wherein the plurality of segments of text includes text content in the first language, the audio portion of the multimedia content includes speech content in the second language, and determining whether a text content of the plurality of segments of text corresponds to a speech content of the audio portion of the multimedia content includes determining if the first language and the second language are the same language.

5. The method of claim 1 wherein the supplementary media content includes a plurality of segments of text and wherein validating the supplementary media content includes identifying a temporal misalignment between a text content of the plurality of segments of text and a speech content of the audio portion of the multimedia content.

6. The method of claim 5 further comprising determining a rate of change of temporal misalignment over a plurality of segments of text and the speech content of the audio portion of the multimedia content.

7. The method of claim 6 further comprising mitigating the temporal misalignment between the text content of the plurality of segments of text and the speech content of the audio portion of the multimedia content according to the determined rate of change of temporal misalignment.

8. The method of claim 1 wherein the supplementary media content includes an audio track and validating the supplementary media content includes determining whether at least some segments of the audio track which include speech content correspond to segments of the audio portion of the multimedia content which do not include speech content.

9. The method of claim 1 wherein the supplementary media content includes an audio track and validating the supplementary media content includes:
   determining a total duration of speech activity in audio track;
   determining a total duration of speech activity in the audio portion of the multimedia content; and
   comparing the total duration of speech activity in the audio track to the total duration of speech activity in the audio portion of the multimedia content.

10. The method of claim 1 wherein the supplementary media content includes an audio track and validating the supplementary media content includes:
   identifying time intervals including voice activity in the audio portion of the multimedia content;
   identifying time intervals including voice activity in the audio track; and
   determining whether any of the time intervals including voice activity in the audio portion of the multimedia content overlaps with the time intervals including voice activity in the audio track.

11. The method of claim 1 wherein the supplementary media content includes an audio track and validating the supplementary media content includes:
   identifying a time offset between a content of the audio track and a content of the audio portion of the multimedia content; and
   aligning the content of the audio track to the content of the audio portion of the multimedia content based on the identified time offset.

12. The method of claim 1 wherein the supplementary media content includes an audio track and validating the supplementary media content includes comparing the audio track to the audio portion of the multimedia content to identify a first plurality of segments in the audio portion that do exist in the audio track and a second plurality of segments in the audio portion that do not exist in the audio track.

13. The method of claim 1 wherein the supplementary media content includes a plurality of segments of text and wherein the plurality of segments of text is associated with an expected time alignment to the audio portion of the multimedia content and validating the supplementary media content includes:
   determining an actual alignment of the plurality of segments of text to the audio portion of the multimedia content; and
   comparing the actual alignment of the plurality of segments of text to the expected alignment of the plurality of segments of text.

14. The method of claim 13 wherein comparing the actual alignment of the plurality of segments of text to the expected alignment of the plurality of segments of text includes identifying one or more differences between the actual alignment of the plurality of segments of text and the expected alignment of the plurality of segments of text.

15. A non-transitory computer-readable medium comprising instructions stored thereon which when executed cause a data processing system to prepare supplementary media content for coordinated transmission with multimedia content by performing the operations of:
   accepting the multimedia content including an audio portion;
   accepting caption data included in the supplementary media content associated with the multimedia content;
   validating the supplementary media content according to the audio portion of the multimedia content based on a phonetic process, wherein validating the supplementary media content comprises aligning, by a wordspotting engine, the caption data against the audio portion based on a phonetic process; determining for captions of the caption data corresponding actual time intervals in the audio portion and flagging captions which do not align within a predetermined tolerance level as misaligned;
   determining a most likely first language of the caption data;
   analyzing the audio content to determine a most likely second language for the audio portion of the multimedia content;
   comparing the most likely first language and the most likely second language;
   if the first and second language are the same language, generating an output indicating that there is no language mismatch; and
   if the first and second language differ, generating an output indicating that there is a language mismatch.

* * * * *